United States Patent
Abe et al.

(10) Patent No.: US 11,104,344 B2
(45) Date of Patent: Aug. 31, 2021

(54) VEHICLE CONTROL UNIT

(71) Applicant: MITSUBISHI JIDOSHA KOGYO KABUSHIKI KAISHA, Tokyo (JP)

(72) Inventors: Hironori Abe, Tokyo (JP); Ryo Shimizu, Tokyo (JP); Kota Nasu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/769,398

(22) PCT Filed: Aug. 29, 2018

(86) PCT No.: PCT/JP2018/031965
§ 371 (c)(1),
(2) Date: Jun. 3, 2020

(87) PCT Pub. No.: WO2019/111459
PCT Pub. Date: Jun. 13, 2019

(65) Prior Publication Data
US 2021/0188280 A1    Jun. 24, 2021

(30) Foreign Application Priority Data
Dec. 4, 2017   (JP) .............................. JP2017-232752

(51) Int. Cl.
*B60W 10/08*    (2006.01)
*B60W 50/023*   (2012.01)
(Continued)

(52) U.S. Cl.
CPC ............ *B60W 30/19* (2013.01); *B60K 6/442* (2013.01); *B60K 6/52* (2013.01); *B60K 6/547* (2013.01);
(Continued)

(58) Field of Classification Search
CPC ...... B60W 30/19; B60W 10/08; B60W 10/11; B60W 50/023; B60W 2510/0208;
(Continued)

(56) References Cited

U.S. PATENT DOCUMENTS 6,806,667 B1 * 10/2004 Sasaki .................... B60K 6/547
                                                        318/432
2015/0210268 A1 * 7/2015 Yang ...................... B60K 6/442
                                                         74/661

(Continued)

FOREIGN PATENT DOCUMENTS

JP    2004-112982 A   4/2004
JP    2013-23022 A    2/2013
(Continued)

OTHER PUBLICATIONS

International Preliminary Report on Patentability for PCT/JP2018/031965 (PCT/IB/373) dated Jun. 9, 2020.
(Continued)

*Primary Examiner* — Tisha D Lewis
(74) *Attorney, Agent, or Firm* — Birch, Stewart, Kolasch & Birch LLP

(57) ABSTRACT

A vehicle includes connecting/disconnecting mechanisms (20,30) disposed on power transmission paths between first rotating electric machines (3,4) mounted on the vehicle and an output shaft (12) that drives a wheel, a first rotating electric machine speed sensor (43,44) that detects a rotation speed of the first rotating electric machine (3,4) as a first rotation speed (Nm,Ng), and a wheel speed sensor (42) that detects a rotation speed of the wheel as a wheel speed (Nw). A control unit (5) includes: a first calculator (5B) that calculates an axle rotation speed (Nam,Nag) representing a rotation speed of the output shaft (12) based on the first rotation speed (Nm,Ng) in a state where the first connecting/disconnecting mechanism (20,30) is engaged; a monitoring
(Continued)

unit (5C) that calculates a deviation (X,Y) between the axle rotation speed (Nam,Nag) calculated by the first calculator (5B) and the wheel speed (Nw); and a second calculator (5D) that calculates the axle rotation speed (Nax,Nay) by calibrating the wheel speed (Nw) based on the calculated deviation (X,Y) in a state where the first connecting/disconnecting mechanism (20,30) is disengaged.

16 Claims, 5 Drawing Sheets

(51) Int. Cl.
    *B60K 6/442*     (2007.10)
    *B60K 17/356*     (2006.01)
    *B60W 30/19*     (2012.01)
    *B60K 17/02*     (2006.01)
    *B60K 6/547*     (2007.10)
    *B60W 10/11*     (2012.01)
    *B60K 6/52*     (2007.10)

(52) U.S. Cl.
    CPC ............ *B60K 17/02* (2013.01); *B60K 17/356* (2013.01); *B60W 10/08* (2013.01); *B60W 10/11* (2013.01); *B60W 50/023* (2013.01); *B60W 2510/0208* (2013.01)

(58) Field of Classification Search
    CPC .......... B60K 6/442; B60K 6/52; B60K 6/547; B60K 17/02; B60K 17/356
    See application file for complete search history.

(56) References Cited

U.S. PATENT DOCUMENTS

| | | | |
|---|---|---|---|
| 2016/0332534 A1* | 11/2016 | Kim | B60L 15/2054 |
| 2019/0101199 A1* | 4/2019 | Bedert | F16H 37/043 |

FOREIGN PATENT DOCUMENTS

| | | |
|---|---|---|
| JP | 2013-46480 A | 3/2013 |
| JP | 2017-5914 A | 1/2017 |

OTHER PUBLICATIONS

International Search Report for PCT/JP2018/031965 dated Oct. 9, 2018.
Written Opinion of the International Searching Authority for PCT/JP2018/031965 (PCT/ISA/237) dated Oct. 9, 2018.

* cited by examiner

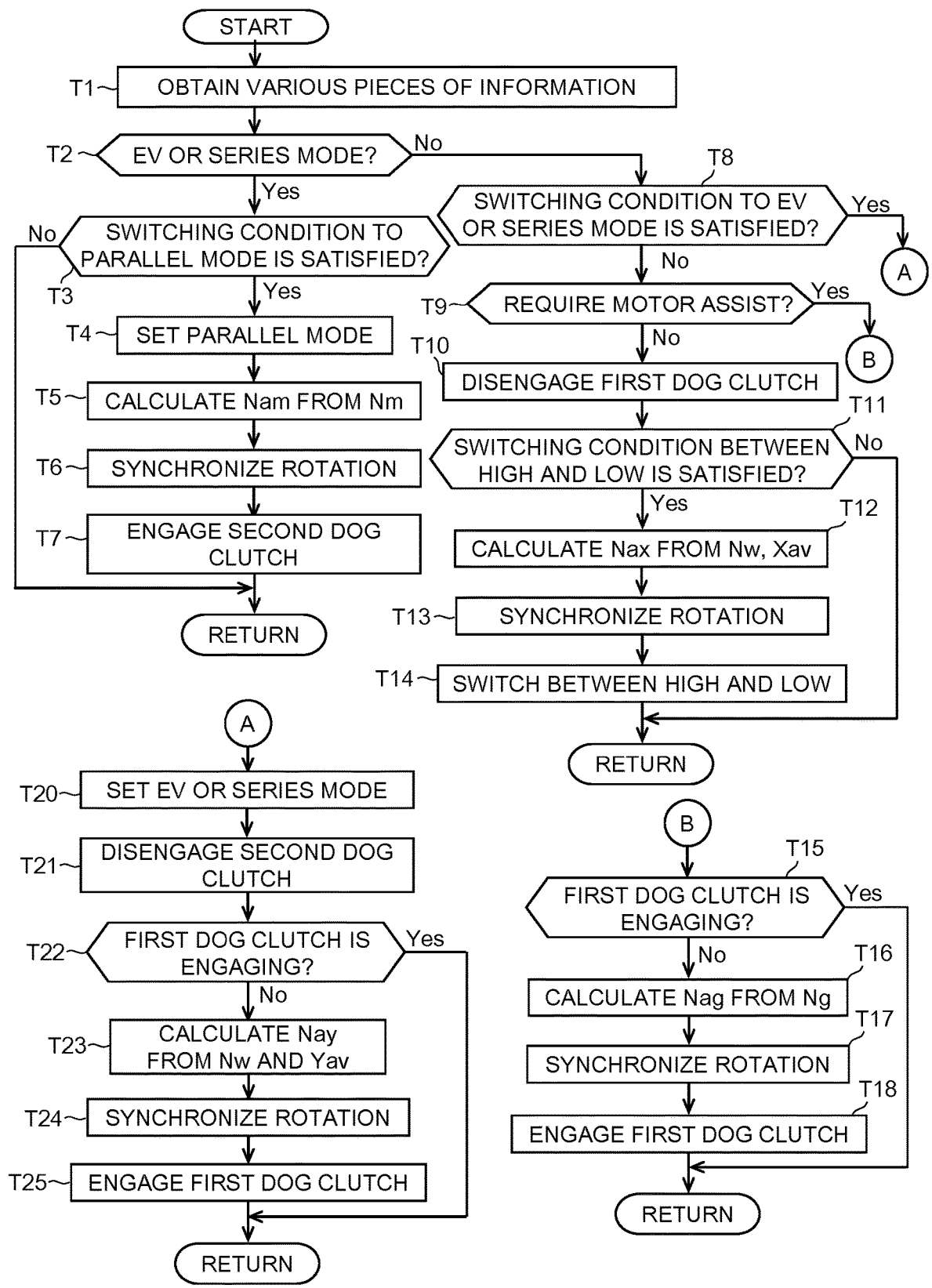

VEHICLE CONTROL UNIT

TECHNICAL FIELD

The present disclosure relates to a control unit of a vehicle having a connecting/disconnecting mechanism provided on a power transmission path between a rotating electric machine and an output shaft.

BACKGROUND ART

Conventionally, in a vehicle having multiple driving sources (e.g., engine, motor, motor generator), clutches (connecting/disconnecting mechanisms) are interposed on the power transmission paths between the driving source and the output shaft, the engaging-disengaging state of the clutch by being controlled, switching of the driving source is performed. When a clutch is to be engaged, synchronization of the rotation is achieved so that the difference between the rotation speed of the driving source side and that of the output shaft side is equal to or less than a predetermined value (e.g., see Patent Document 1).

PRIOR ART DOCUMENTS

Patent Literature

[Patent Document 1] Japanese Laid-open Patent Publication No. 2017-5914

SUMMARY

Detailed Description

Problems to be Solved by the Disclosure

In order to synchronize the rotation for clutch engagement, the driving source is controlled such that the rotation speed of the driving source side matches the rotation speed (hereinafter referred to as "axle rotation speed") of the output shaft side. Generally, the driving source is provided with a high-precision rotation speed sensor for precisely controlling the operating state of the driving source. However, since the axle rotation speed is detected by a wheel speed sensor having a lower detection precision than the rotation speed sensor provided in the driving source, there is a problem that it is difficult to accurately rotate synchronize rotation during clutch engagement.

Means to Solve Problem (1) A control unit disclosed herein for controlling a vehicle, the vehicle including a first connecting/disconnecting mechanism disposed on a first power transmission path between a first rotating electric machine mounted on the vehicle and an output shaft that drives a wheel, a first rotating electric machine speed sensor that detects a rotation speed of the first rotating electric machine as a first rotation speed, and a wheel speed sensor that detects a rotation speed of the wheel as a wheel speed, the control unit including: a first calculator that calculates an axle rotation speed representing a rotation speed of the output shaft based on the first rotation speed in a state where the first connecting/disconnecting mechanism is engaged; a monitoring unit that calculates a deviation between the axle rotation speed calculated by the first calculator and the wheel speed; and a second calculator that calculates the axle rotation speed by calibrating the wheel speed based on the calculated deviation in a state where the first connecting/disconnecting mechanism is disengaged.

(2) Preferably, the monitoring unit periodically calculates the deviation while the vehicle is running and stores an average value of a plurality of the deviations periodically calculated.

(3) Preferably, the vehicle further includes a second rotating electric machine mounted on a second power transmission path connected to the output shaft and a second connecting/disconnecting mechanism disposed on the second power transmission path. In this case, it is preferable the control unit further includes a controller that controls respective engaging-disengaging states of the first connecting/disconnecting mechanism and the second connecting/disconnecting mechanism; and the controller uses the axle rotation speed calculated by the second calculator to synchronize rotation of the second connecting/disconnecting mechanism to engage the second connecting/disconnecting mechanism in a state where the first connecting/disconnecting mechanism is disengaged.

(4) The first power transmission path and the second power transmission path are preferably configured such that a number of transmission stages from the output shaft to the first rotating electric machine is less than a number of transmission stages from the output shaft to the second rotating electric machine.

(5) It is preferable that the vehicle further includes an engine that is mounted on the vehicle and that causes the second rotating electric machine to generate electric power, and power of the engine is transmitted to the output shaft through the second power transmission path; and the second connecting/disconnecting mechanism has a function of engaging and disengaging the power through the second power transmission path and a function of switching between a high-gear stage and a low-gear stage.

(6) Preferably, the controller uses the axle rotation speed calculated by the first calculator to synchronize rotation of the second connecting/disconnecting mechanism to engage the second connecting/disconnecting mechanism in a state where the first connecting/disconnecting mechanism is engaged.

(7) Preferably, the vehicle further includes a second rotating electric machine speed sensor that detects a rotation speed of the second rotating electric machine as a second rotation speed. In this case, it is preferable that, in engaging the second connecting/disconnecting mechanism in a state where the first connecting/disconnecting mechanism is disengaged, the controller engages the second connecting/disconnecting mechanism after controlling, based on the axle rotation speed calculated by the second calculator and the second rotation speed detected by the second rotating electric machine speed sensor, the second rotating electric machine such that rotation of the second connecting/disconnecting mechanism synchronizes.

(8) Preferably, the control unit further includes a subcontroller that controls an engaging-disengaging state of the first connecting/disconnecting mechanism. In this case, it is preferable that, in engaging the first connecting/disconnecting mechanism in a state of being disengaged, the subcontroller engages the first connecting/disconnecting mechanism after controlling, based on the axle rotation speed calculated by the second calculator and the first rotation speed detected by the first rotating electric machine speed sensor, the first rotating electric machine such that rotation of the first connecting/disconnecting mechanism synchronizes.

(9) Preferably, the vehicle further includes a second rotating electric machine speed sensor that detects a rotation speed of the second rotating electric machine as a second rotation speed. In this case, it is preferable that each of the first connecting/disconnecting mechanism and the second connecting/disconnecting mechanism is a dog clutch; the first calculator calculates the axle rotation speed based on the second rotation speed in a state where the second connecting/disconnecting mechanism on the second power transmission path is engaged; the monitoring unit calculates a second deviation representing a deviation between the axle rotation speed calculated based on the second rotation speed and the wheel speed; the second calculator calculates the axle rotation speed using the wheel speed and the second deviation in the state where the second connecting/disconnecting mechanism on the second power transmission path is disengaged; and the controller uses the axle rotation speed calculated from the wheel speed and the second deviation to synchronize rotation of the first connecting/disconnecting mechanism to engage the first connecting/disconnecting mechanism in a state where the second connecting/disconnecting mechanism on the second power transmission path is disengaged.

(10) The control unit preferably includes a prohibitor that prohibits, when the deviation is a predetermined value or more, the first connecting/disconnecting mechanism from being disengaged.

(11) Preferably, the vehicle includes the first rotating electric machine that drives one of a front wheel and a rear wheel, a third rotating electric machine that drives the other one of the front wheel and the rear wheel without being interposed by a connecting/disconnecting mechanism, and a third rotating electric machine speed sensor that detects a rotation speed of the third rotating electric machine as a third rotation speed. In this case, it is preferable that when the wheel speed sensor has a failure, the second calculator calculates, based on the third rotation speed, a rotation speed of an axle connected to the one wheel.

Effect of the Disclosure

According to the control unit disclosed herein, the axle rotation speed can be precisely calculated.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 5 is a flowchart example for explaining the content of control performed by the control unit of FIG. 1.

EMBODIMENT TO CARRY OUT THE DISCLOSURE

Description will now be made in relation to a vehicle control unit according to an embodiment with reference to the accompanying drawings. The following embodiment is merely illustrative and is not intended to exclude the application of various modifications and techniques not explicitly described in the embodiment. Each configuration of the present embodiment can be variously modified and implemented without departing from the scope thereof. Also, the configuration can be selected or omitted according to the requirement or appropriately combined.

[1. Overall Configuration]

Figure 1:
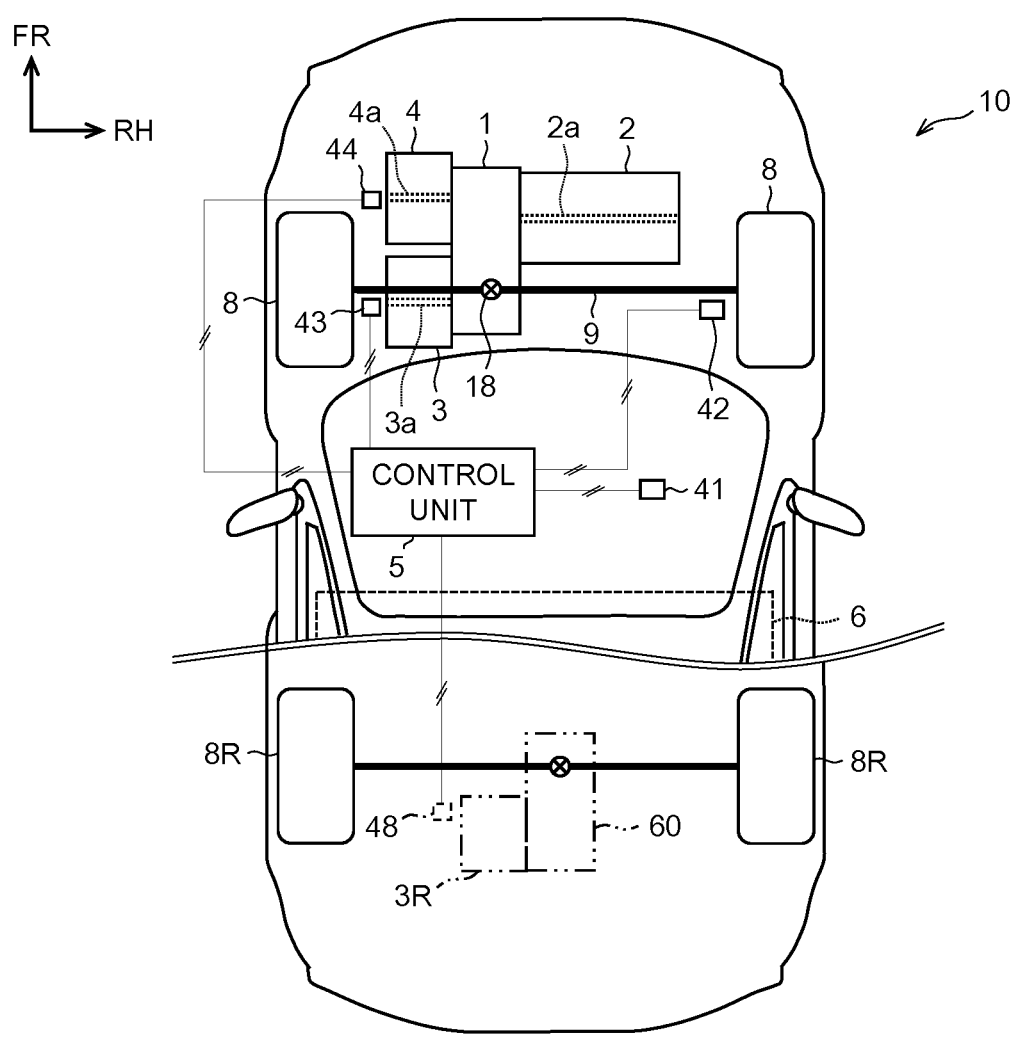
FIG. 1 is a top view illustrating an internal structure of a vehicle mounted with a control unit according to an embodiment.

A control unit 5 of the present embodiment is applied to a vehicle 10 shown in FIG. 1, and controls a transaxle 1 mounted on the vehicle 10. The vehicle 10 is a FF-type hybrid vehicle equipped with an engine 2 as a driving source and a motor 3 (electric motor, a first rotating electric machine) for running, and a generator 4 (a second rotating electric machine) for power generation. The generator 4 is coupled to the engine 2 and is operable independently of the operating state of the motor 3. In addition, three of running modes of an EV mode, a series mode, and a parallel mode are prepared for the vehicle 10. These running modes, by the control unit 5, are alternatively selected according to the vehicle state and the running state, and a required output of the driver, and the engine 2, the motor 3, and the generator 4 are individually used depending on the selected mode.

The EV mode is a running mode in which the vehicle 10 is driven only on the motor 3 using the charged power of a driving-purpose battery 6, stopping the engine 2 and the generator 4. The EV mode is selected when a driving load and a vehicle speed are low or the charging level of the battery 6 is high. The series mode is a running mode in which the generator 4 is driven by the engine 2 to generate electric power and also the vehicle 10 is driven by the motor 3 using the generated electric power. The series mode is selected when a running load and a vehicle speed are moderate, or the charging level of the battery 6 is low. The parallel mode is a running mode in which the vehicle 10 is driven mainly by the power of the engine 2 and the driving of the vehicle 10 is assisted by the motor 3 if necessary, and is selected when a running load and a vehicle speed are high.

The diving wheels 8 (wheels, front wheels in this embodiment), the engine 2 and the motor 3 are connected in parallel through the transaxle 1, and the respective power of the engine 2 and the motor 3 are individually transmitted from different power transmission paths. This means that each of the engine 2 and the motor 3 is a driving source that drives the output shaft 12 of the vehicle 10. Further, to the engine 2, the generator 4 and the driving wheels 8 are connected in parallel through the transaxle 1, and the power of the engine 2 is also transmitted to the generator 4 in addition to the driving wheels 8.

The transaxle 1 is a power transmission device formed by integrating a final drive (final reduction gear) including a differential gear 18 (differential device) and a transmission (reduction gear), and incorporates therein multiple mechanisms that is involved in power transmission between the driving source and a driven device. The transaxle 1 of the present embodiment is configured to enable high-low switching (switching between the high-speed stage and the low-speed stage). In the running in the parallel mode, the high-gear stage and the low-gear stage are switched by the control unit 5 according to, for example, the running state or the required output. Hereinafter, the running in the parallel mode is also referred to as "parallel driving".

The engine 2 is an internal combustion engine (gasoline engine, diesel engine) that uses gasoline or diesel oil as fuel. The engine 2 is a so-called lateral engine arranged laterally such that the direction of a crankshaft 2*a* (rotary shaft)

coincides with the width direction of the vehicle 10, and is fixed to the right side surface of the transaxle 1. The crankshaft 2*a* is positioned in parallel to the drive shaft 9 of the drive wheels 8. The operating state of the engine 2 is controlled by the control unit 5.

The motor 3 and the generator 4 of the present embodiment are each an electric motor generator having both a function as an electric motor and a function as a generator. The motor 3 mainly functions as an electric motor to drive the vehicle 10, and functions as a generator during regeneration. The generator 4 functions as an electric motor (starter) when starting the engine 2, and generates electric power using the engine power when the engine 2 is operating. An inverter (not shown) for converting a direct current and an alternating current is provided around (or in) each of the motor 3 and the generator 4. Each of the rotation speeds of the motor 3 and the generator 4 is controlled by controlling the inverter. Incidentally, the operating states of the motor 3, the generator 4, and the inverters are controlled by the control unit 5.

Figure 2:
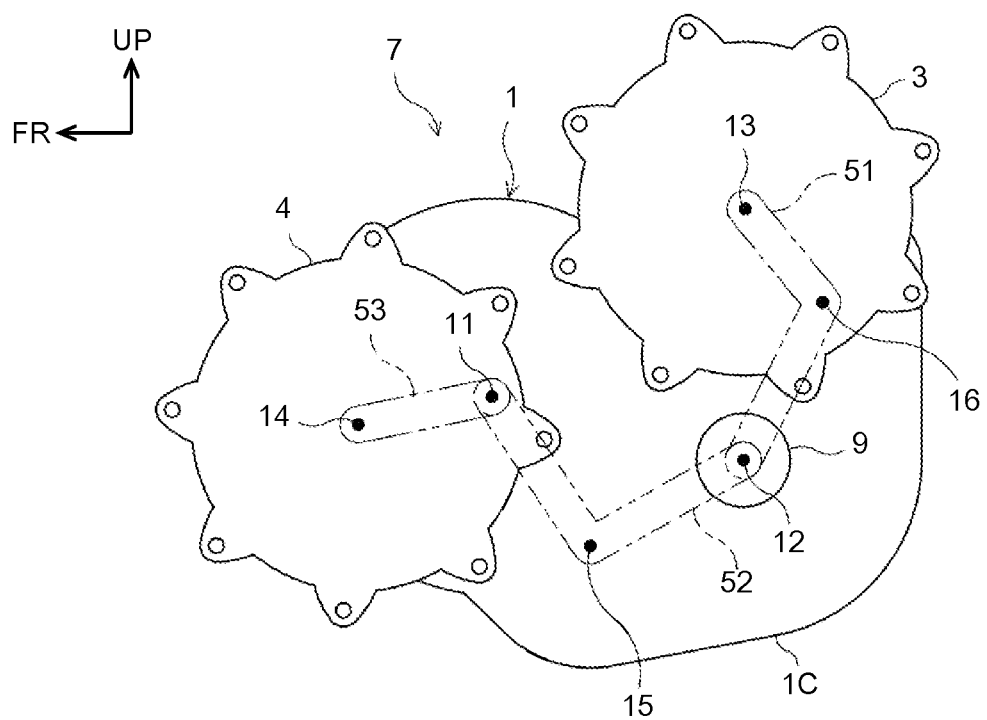
FIG. 2 is a schematic side view showing a powertrain including a transaxle mounted on the vehicle of FIG. 1.

FIG. 2 is a side view of the power train 7 as viewed from the left side. The powertrain 7 includes the engine 2, the motor 3, the generator 4, and the transaxle 1. In FIG. 2, the engine 2 is omitted.

In the vehicle 10, the control unit 5 for integrally controlling various devices mounted on the vehicle 10. Further, the vehicle 10 includes an acceleration opening sensor 41 that detects the depression amount of the accelerator pedal (degree of acceleration opening), a wheel speed sensor 42 that detects the wheel speed Nw representing a rotation speed of the wheel, a motor rotation speed sensor 43 (first rotating electric machine speed sensor) that detects the rotation speed Nm (first rotation speed) of the motor 3, a generator rotation speed sensor 44 (second rotating electric machine sensor) that detects a rotation speed Ng of the generator 4 (second rotation speed). The data detected by each of the sensors 41 to 44 is transmitted to the control unit 5. The motor rotation speed sensor 43 and the generator rotation speed sensor 44 have higher detection precision than that of the wheel speed sensor 42.

The control unit 5 is an electronic controller configured to be an LSI device or an embedded electronic device in which, for example, a microprocessor, a ROM, a RAM, and the like are integrated, and integrally controls various devices mounted on the vehicle 10. The control unit 5 of the present embodiment selects a running mode in accordance with a required output of the driver or the like, controls various devices (e.g., the engine 2 and the motor 3) according to the selected running mode, and also controls the disengaging state of the clutches 20 and 30 in the transaxle 1. This control will be described below.

[2. Transaxle]

Figure 3:
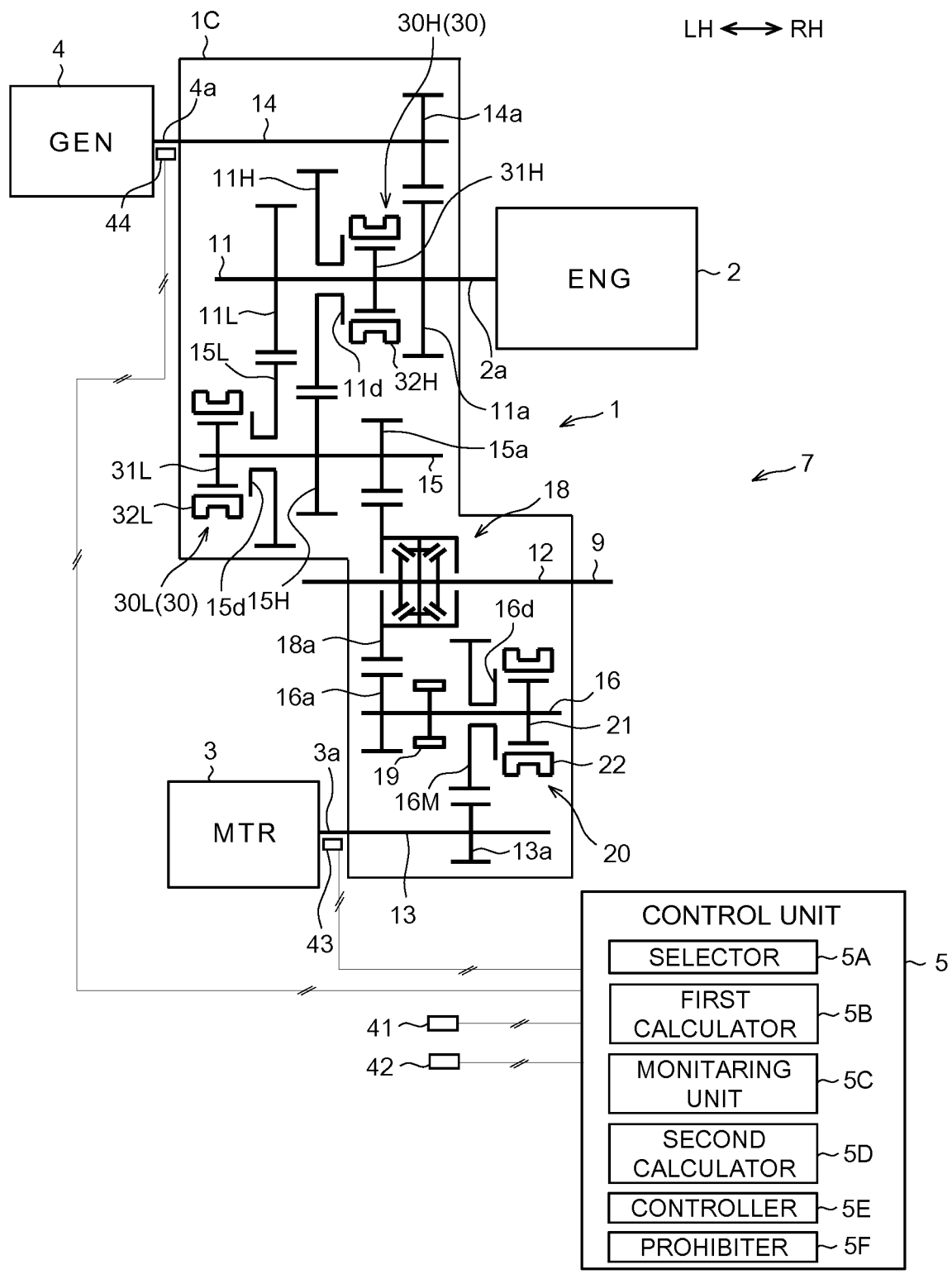
FIG. 3 is a skeleton diagram showing a powertrain including the transaxle of FIG. 2.

FIG. 3 is a skeleton diagram of a powertrain 7 including the transaxle 1 of the present embodiment. As shown in FIGS. 2 and 3, the transaxle 1 is provided with six shafts 11-16 arranged in parallel to each other. Hereinafter, a rotary shaft connected coaxially with the crankshaft 2*a* is referred to as an input shaft 11.

Similarly, rotary shafts connected coaxially with the drive shaft 9, a rotary shaft 3*a* of the motor 3, a rotary shaft 4*a* of the generator 4 are referred to as an output shaft 12, a motor shaft 13, a generator shaft 14, respectively. Further, the rotary shaft disposed on the power transmission path between the input shaft 11 and the output shaft 12 is referred to as a first counter shaft 15, and the rotary shaft disposed on the power transmission path between the motor shaft 13 and the output shaft 12 referred to as a second counter shaft 16.

The both ends of each of the six shafts 11-16 are journaled to a casing 1C through non-illustrated bearings.

Three power transmission paths connected to the output shaft 12 are formed inside the transaxle 1. Specifically, as shown by a two-dotted chain line in FIG. 2, a power transmission path (hereinafter referred to as "a first path 51") from the motor 3 to the output shaft 12 through the motor shaft 13, a power transmission path (hereinafter referred to as "a second path 52") from the engine 2 to the output shaft 12 through the input shaft 11, and a power transmission path (hereinafter referred to as "a third path 53") from the engine 2 to the generator shaft 14 through the input shaft 11 are formed. Here, the first path 51 and the second path 52 are driving-power transmission paths, the third path 53 is a power-generation-power transmission path.

The first path 51 (first power transmission path) is a path related to power transmission between the motor 3 and the drive wheels 8, which is involved in the power transmission of the motor 3. On the first path 51, the motor shaft 13 to which power is transmitted by rotating in synchronization with the motor 3 and a second counter shaft 16 to which the power of the motor shaft 13 power is transmitted are provided, and, on an intermediate point of the first path 51, a first dog clutch 20 (first connecting/disconnecting mechanism, dog clutch) that is to be described below and that disengages the power transmission through the first path 51 is interposed.

On the second path 52 (second power transmission path), the input shaft 11 to which power is transmitted by rotating in synchronization with the generator 4 and a first counter shaft 15 to which the power of the input shaft 11 power is transmitted are provided, and on an intermediate point of the second path 52, a second dog clutch 30 (second connecting/disconnecting mechanism, dog clutch) that is to be described below and that disengages the power transmission through the second path 52 and switches between high and low is interposed.

The third path 53 is a path relating to power transmission between the engine 2 and the generator 4, and is involved in power transmission at the start of the engine and power transmission at the time of electric power generation by the engine 2.

Next, the configuration of the transaxle 1 will be detailed with reference to FIG. 3. In the following description, a "fixed gear" means a gear provided integrally with a shaft and rotates in synchronization with the shaft (incapable of relative rotating). Further, the "idle gear" means a gear which is rotatably pivoted to the shaft.

The input shaft 11 is provided with, in sequence from the side near to the engine 2, a fixed gear 11*a*, the second dog clutch 30 on the high side (hereinafter, referred to as "the high-side dog clutch 30H"), an idle gear 11H, and a fixed gear 11L. Further, the first counter shaft 15 is provided with, in sequence from the side near to the engine 2, a fixed gear 15*a*, a fixed gear 15H, an idle gear 15L, the second dog clutch 30 on the low side (hereinafter, referred to as "the low-side dog clutch 30L").

The fixed gear 11*a* of the input shaft 11 always meshes with the fixed gear 14*a* provided on the generator shaft 14. This means that the input shaft 11 and the generator shaft 14 are connected via two fixed gears 11*a* and 14*a* to make it possible to transmit power between the engine 2 and the generator 4. Further, the fixed gear 15*a* of the first counter shaft 15 always meshes with a ring gear 18*a* of the differential 18 provided on the output shaft 12.

The idle gear 11H of the input shaft 11 has more teeth than the adjacent fixed gear 11L, and always meshes with the fixed gear 15H of the first counter shaft 15 to form a high-gear stage. Further, the fixed gear 11L of the input shaft 11 always meshes with the idle gear 15L of the first counter shaft 15 to form a low-gear stage. The idle gears 11H and 15L have dog gears 11d and 15d provided integrally on the side surface of each tooth surface portion meshing with the fixed gears 15H and 11L, respectively. Non-illustrated dog teeth are provided at the end portions (edges on radially outer parts) of the dog gears 11d and 15d.

The high-side clutch 30H and the low-side clutch 30L that constitute the second dog clutch 30 are clutch mechanisms provided on the second path 52, and has a function to switch between the high-gear stage and the low-gear stage in addition to a function of disengaging power through the second path 52. In cases where the running mode is the EV mode or the series mode, the second dog clutch is disengaged; and in cases where the running mode is the parallel mode, the second dog clutch 30 is engaged. In the present embodiment, when the running mode is the parallel mode, one of the high-side dog clutch 30H and the low-side dog clutch 30L is engaged and the other is disengaged. Incidentally, which of the clutches 30H, 30L is engaged is determined on the basis of, for example, the running state and the required output of the vehicle 10.

The high-side dog clutch 30H has a hub 31H fixed to the input shaft 11 and an annular sleeve 32H. Further, the low-side dog clutch 30L has a hub 31L fixed to the first counter shaft 15 and an annular sleeve 32L. The sleeves 32H, 32L are incapable of rotating relative to the respective hubs 31H, 32L and are coupled to the respective hubs 31H, 31L so as to be slidable in the axial direction of the hubs 31H, 31L. Each of the sleeves 32H, 32L slides in the axis direction by the control unit 5 controlling a non-illustrated actuator (e.g. servo motor). A stroke sensor that detects a movement amount (stroke amount) (not shown) is provided near each of the sleeves 32H, 32L. Further, spline teeth (not shown) that mesh with the dog teeth of the dog gears 11d and 15d are provided radially inward parts of the sleeves 32H and 32L, respectively.

In a state where the sleeve 32H engages with the dog gear 11d, the driving force from the engine 2 is transmitted to the output shaft 12 through the gear pair 11H and 15H on the high side. Conversely, in a state where the sleeve 32H is disengaged from the dog gear 11d, the idle gear 11H becomes idle state so that the second path 52 comes into a state the power transmission on the high side of the second path 52 is shut. Further, in a state where the sleeve 32L engages with the dog gear 15d, the driving force from the engine 2 is transmitted to the output shaft 12 through the gear pair 11L and 15L on the low side. In contrast, in cases where the sleeve 32L is separated from the dog gear 15d, the idle gear 5L becomes idle state so that the second path 52 comes into a state the power transmission on the low side of the second path 52 is shut.

The second counter shaft 16 is provided with, in sequence from the side near to the engine 2, a first dog clutch 20, an idle gear 16M, a parking gear 19, and a fixed gear 16a. The fixed gear 16a always engages with the ring gear 18a of the differential 18. The parking gear 19 is a component constituting the parking locking device. When the P-range is selected by the driver, the parking gear 19 engages with a parking plug (not shown) to inhibit rotation of the second counter shaft 16 (i.e., output shaft 12).

The idle gear 16M has more teeth than the fixed gear 13a provided on the motor shaft 13, and always meshes with the fixed gear 13a. The idle gear 16M has dog gears 16d provided integrally on the right side of the tooth surface portion meshing with the fixed gear 13a. At the tip portion of the dog gear 16d, dog teeth are provided. The first dog clutch 20 has a hub 21 which is fixed to the second counter shaft 16, and an annular sleeve 22 which is incapable of relatively rotate around the hub 21 (second counter shaft 16) and is slidably coupled to the hub 21 in the axial direction. The sleeve 22 slides in the axis direction by the control unit 5 controlling a non-illustrated actuator and the movement amount (stroke amount) of the sleeve 22 is detected by a non-illustrated stroke sensor. Spline teeth (not shown) that mesh with the dog teeth at the tip of the dog gear 16d are provided radially inward of the sleeve 22.

In the present embodiment, the first dog clutch 20 is engaged when the running mode is the EV mode or the series mode, or when the running mode is the parallel mode and motor assist is required. That is, the sleeve 22 is meshed (engaged) with the dog gear 16d, and the driving force from the motor 3 is transmitted to the output shaft 12. Further, when the running mode is a parallel mode and the assist by the motor 3 is not required, the first dog clutch 20 is disengaged. That is, the sleeve 22 and the dog gear 16d are separated, and the idle gear 16M comes into an idle state, so that the power transmission of the first path 51 comes into a state the power transmission on the first path 51 is shut.

Further, in the transaxle 1 of the present embodiment, the first path 51 and the second path 52 are formed such that the number of transmission stages from the output shaft 12 to the motor 3 is two in contrast to the number of transmission stages from the output shaft 12 to the generator 4 being three. This means that, in the present embodiment, the power of the generator 4 is shifted at three positions of: the fixed gear 14a and the fixed gear 11a; the high-gear stage or the low-gear stage; and the fixed gear 15a and the ring gear 18a until reaching the output shaft 12. In contrast, the power of the motor 3 is shifted at two positions of: the fixed gear 13a and the idle rolling gear 16M; and the fixed gear 16a and the ring gear 18a until reaching the output shaft 12.

[3. Overview of Control]

In the transaxle 1 described above, the control unit 5 selects a running mode in accordance with, for example, a running state of the vehicle 10 and the required output of the driver and also controls the engaging-disengaging states of the clutches 20, 30 in accordance with the selected running mode. The control unit 5 of the present embodiment synchronizes the rotation speed of the driving source side with the rotation speed of the output shaft 12 side when engaging the clutches 20, 30. In this synchronization, the control unit 5 changes a value to be referred to so as to enhance the precision thereof according to the circumstance.

Further, in the state where the first dog clutch 20 is engaged, the control unit 5 calculates a deviation X (=Nam−Nw) between the value Nw detected by the wheel speed sensor 42 and the value Nam obtained by converting (calculating) the value Nm detected by the motor rotation speed sensor 43 into an axle rotation speed value, and stores the deviation X. Similarly, in the state where the second dog clutch 30 is engaged, the control unit calculates a deviation Y (=Nag−Nw) between the value Nw detected by the wheel speed sensor 42 and the value Nag obtained by converting (calculating) a value Ng detected by the generator rotation speed sensor 44 into an axle rotation speed and stores the deviation Y. These deviations (misalignments) X and Y are used to correct the wheel speed Nw detected when the clutches 20 and 30 are in the disengaging state (during being disengaged), and are calculated as the axle rotational speeds Nax and Nay at that time. The deviation X, Y will be described below.

Hereinafter, when two deviations X and Y are distinguished from each other, the former is called a first deviation X, and the latter is called a second deviation Y. While the state of the clutches 20 and 30 are in the disengaging state, the rotation can be accurately synchronized by correcting the wheel speed Nw on the basis of the calculated deviations X and Y and calculating the axle rotation speeds Nax and Nay.

Furthermore, when the first deviation X is a predetermined value Xp or more, the control unit 5 of the present embodiment determines the wheel speed sensor 42 and/or the motor rotation speed sensor 43 have a possibility of having a failure, and prohibits disengagement of the first dog clutch 20.

The control unit 5 of the present embodiment periodically calculates and stores (updates) the above deviations X, Y during a single driving cycle (from IG-ON to IG-OFF), calculates the average values Xav, Yav of the deviations X, Y, respectively. These average values Xav, Yav are added to the wheel speed Nw detected during the disengagement of the clutch 20 or 30, and are calculated as the axle rotation speed Nax, Nay at that time. Hereinafter, the rotation synchronization of each of the clutches 20, 30 will be detailed.

When the first dog clutch 20 in the disengaging state is to be engaged, the rotation speed of the motor 3 side (dog gear 16d) can be obtained from the motor rotation speed Nm detected by the motor rotation speed sensor 43 and the gear ratio of the fixed gears 13a, 16M. On the other hand, the rotation speed of the output shaft 12 side (sleeve 22) is determined from the axle rotation speed being the rotation speed of the output shaft 12 and the gear ratio of the fixed gear 16a and the ring gear 18a.

Here, when the first dog clutch 20 is to be engaged in a state where the second dog clutch 30 is engaged, the axle rotation speed Nag is calculated on the basis of the generator rotation speed Ng detected by the generator rotation speed sensor 44. That is, in cases where the first dog clutch 20 which is disengaged because the motor assist is not required during the parallel running is to be reengaged, the rotation is synchronized on the basis of the motor rotation speed Nm and the generator rotation speed Ng without using the wheel speed Nw.

In contrast, in cases where the first dog clutch 20 is to be engaged under the disengaging state of the second dog clutch 30, since the generator rotation speed Ng is not able to be used, the axle rotation speed Nay is calculated on the basis of the wheel speed Nw detected by the wheel speed sensor 42 and the average value Yav stored (average value of the second deviation Y). For example, when the parallel mode is switched to the EV mode or the series mode, the axle rotation speed Nay is calculated by correcting the wheel speed Nw on the basis of the average value Yav of the second deviation Y stored when the second dog clutch 30 is in the engaging state and rotation is synchronized on the basis of the axle rotation speed Nay and the motor rotation speed Nm.

Further, when the high-side dog clutch 30H in the disengaging state is to be engaged, the rotation speed of the generator 4 side (sleeve 32H) can be obtained by the generator rotation speed Ng detected by the generator rotation speed sensor 44 and the gear ratio of the fixed gear 11a,14a. On the other hand, the rotation speed of the output shaft 12 side (dog gear 11d) is obtained from the axle rotation speed, the gear ratio of the high-gear stage, and the gear ratio of the fixed gear 15a and the ring gear 18a.

Here, in cases where the high-side dog clutch 30H is to be engaged under the engaging state of the first dog clutch 20, the axle rotation speed Nam is calculated on the basis of the motor rotation speed Nm detected by the motor rotation speed sensor 43. For example, when the EV mode or the series mode is switched to the parallel mode (high-gear stage), for example, rotation is synchronized on the basis of the motor rotation speed Nm and the generator rotation speed Ng without using the wheel speed Nw.

In contrast, when the high-side dog clutch 30H is to be engaged in the engaging state of the first dog clutch 20, since the motor rotation speed Nm is not able to be used, the axle rotation speed Nax is calculated on the basis of the wheel speed Nw detected by the wheel speed sensor 42 and the average value Xav stored (the average value of the first deviation X). For example, when the low-gear stage is switched to the high-gear stage during the parallel running not requiring motor assist, the axle rotation speed Nax is calculated by correcting the wheel speed Nw on the basis of the average value Xav of the first deviation X stored when the first dog clutch 20 is in the engaging state (during engagement) and the rotation is synchronized on the basis of the axle rotation speed Nax and the generator rotation speed Ng.

Further, in cases where the low-side clutch 30L in the disengaging state is to be engaged, the rotation speed of the generator 4 side (dog gear 15d) is obtained from the generator rotation speed Ng, the gear ratio of the fixed gear 11a, 14a, and the gear ratio of the low-gear stage. On the other hand, the rotation speed of the output shaft 12 side (sleeve 32L) is obtained from the axle rotation speed, and the gear ratio of the fixed gear 15a and the ring gear 18a. Here, the low-side dog clutch 30L is to be engaged in the engaging state of the first dog clutch 20, the axle rotation speed Nam is calculated on the basis of the motor rotation speed Nm likewise the high side.

In contrast, when the low-side dog clutch 30L is to be engaged in the engaging state of the first dog clutch 20, since the motor rotation speed Nm is not able to be used, the axle rotation speed Nax is calculated on the basis of the wheel speed Nw detected by the wheel speed sensor 42 and the average value Xav stored (the average value of the first deviation X) likewise the high side. For example, when the high-gear stage is switched to the low-gear stage during the parallel running not requiring motor assist, the axle rotation speed Nax is calculated by correcting the wheel speed Nw on the basis of the average value Xav of the first deviation X stored while the first dog clutch 20 is engaged and the rotation is synchronized on the basis of the axle rotation speed Nax and the generator rotation speed Ng.

[4. Control Configuration]

The control unit 5 is provided with a selector 5A, a first calculator 5B, a monitoring unit 5C, a second calculator 5D, a controller 5E, and a prohibitor 5F as elements for executing clutch engaging and disengaging control including the above-described rotation synchronization and prohibition of disengaging the first dog clutch 20. These elements indicate some functions of the program executed by the control unit 5, and are assumed to be implemented by software. However, some or all of the functions may be achieved by hardware (electronic circuits), or may be achieved by a combination of software and hardware.

The selector 5A selects a running mode from the EV mode, the series mode, and the parallel mode on the basis of the driving state of the vehicle 10, the required output of the driver, and the charging state of battery 6. Here, the required output is the output (output demand) the driver demands with respect to the vehicle 10, and is estimated (calculated) on the basis of, for example, the degree of accelerator opening or the vehicle speed. The selector 5A selects the EV mode when the vehicle 10 starts or stops, for example. In addition, the selector 5A selects the parallel mode when the running load or vehicle speed is high, and selects the series mode when the charging rate of the battery 6 is low. While the parallel mode is selected, the selector 5A of the present embodiment determines, for example, on the basis of the required output or the vehicle speed, whether or not motor assist is required.

The first calculator 5B calculates the axle rotation speed Nam based on the motor rotation speed Nm in the engaging state of the first dog clutch 20. The first calculator 5B of the present embodiment, under the engaging state of the second dog clutch 30, also calculates the axle rotation speed Nag based on the generator rotation speed Ng. The first calculator 5B may calculate the axle rotation speed Nam, Nag based on the motor rotation speed Nm and the generator rotation speed Ng, respectively, when both clutches 20, 30 are engaged.

The monitoring unit 5C calculates (obtains) the deviation X (first deviation) between the axle rotational speed Nam calculated by the first calculator 5B and the wheel speed Nw. The monitoring unit 5C of this embodiment also calculates (obtains) the deviation Y (second deviation) between the axle rotation speed Nag calculated by the first calculator 5B and the wheel speed Nw. That is, when the axle rotation speeds Nam and Nag are transmitted from the first calculator 5B, the values X (=Nam−Nw) and Y (=Nag−Nw) are calculated by subtracting the wheel speed Nw detected at that time from the respective values Nam and Nag. The monitoring unit 5C preferably calculates the deviations X, Y when the wheels are not slipping or locking while the vehicle 10 is running (when running normally).

The monitoring unit 5C of the present embodiment calculates and stores the first deviation X and the second deviation Y periodically during running of the vehicle 10. Then, the average value Xav of all the stored first deviations X is calculated, and is stored in place of the currently stored average value Xav (i.e., the average value Xav is updated). The average value Yav of the second deviation Y is calculated and stored (updated) in the same manner. The monitoring unit 5C may store a single average value Xav of the first deviation X and a single average value Yav of the second deviation Y, or may associate the deviations X and Y with driving state (e.g., vehicle speed and load) and thereby store (i.e., multiple) average values Xav and Yav for each driving state.

The second calculator 5D calculates the axle rotation speed Nax by correcting the wheel speed Nw on the basis of the first deviation X calculated (stored) in the disengaging state of the first dog clutch 20. In the disengaging state of the second dog clutch 30, the second calculator 5D of the present embodiment also calculates the axle rotation speed Nay by also correcting the wheel speed Nw on the basis of the second deviation Y. When the average values Xav and Yav are stored in the monitoring unit 5C for each driving state, the second calculating unit 5D preferably calculates the axle rotational speeds Nax and Nay by selecting the average values Xav and Yav corresponding to the driving state at the time of the calculation.

In other words, in the control unit 5, the axle rotation speed Nam is calculated by the first calculator 5B in the engaging state of the first dog clutch 20, and the axle rotation speed Nax is calculated by the second calculator 5D in the disengaging state of the first dog clutch 20. Further, the axle rotation speed Nag is calculated by the first calculator 5B in the engaging state of the second dog clutch 30 and the axle rotation speed Nay is calculated by the second calculator 5D in the disengaging state of the second dog clutch 30.

The controller 5E controls the engaging-disengaging state of the first dog clutch 20 and the engaging-disengaging state of the second dog clutch 30 in accordance with the running mode selected by the selector 5A. Specifically, when the first dog clutch 20 in the disengaging state is to be engaged, the controller 5E synchronizes rotation by controlling the torque of the motor 3 such that the rotation speed of the motor 3 side (dog gear 16d) coincides with the rotation speed of the output shaft 12 side (sleeve 22). Then, the control unit 5A moves the sleeve 22 in a direction toward the dog gear 16d by controlling the actuator. Incidentally, the controller 5E of the present embodiment includes a function as a sub-controller that controls the engaging-disengaging state of the first dog clutch 20.

When the first dog clutch 20 is to be engaged in the engaging state of the second dog clutch 30, the controller 5E obtains the rotation speed of the output shaft 12 side using the axle rotation speed Nag calculated by the first calculator 5B. That is, in this case, the controller 5E engages the first dog clutch 20 after controlling the motor 3 such that the rotation of the first dog clutch 20 is synchronized on the basis of the axle rotation speed Nag calculated by the first calculator 5B and the motor rotation speed Nm detected by the motor rotation speed sensor 43.

Further, when the first dog clutch 20 is to be engaged in the disengaging state of the second dog clutch 30, the controller 5E obtains the rotation speed of the output shaft 12 side using the axle rotation speed Nay calculated by the second calculator 5D. That is, in this case, the controller 5E engages the first dog clutch 20 after controlling the motor 3 such that the rotation of the first dog clutch 20 is synchronized on the basis of the axle rotation speed Nay calculated by the second calculator 5D and the motor rotation speed Nm detected by the motor rotation speed sensor 43. The above control precisely obtains the axle rotation speed, regardless of the engaging-disengaging state of the second dog clutch 30, so that the precision of the rotation synchronization can be enhanced.

Further, when the rotation speed of the generator 4 side is to be made coincide with the rotation speed of the output shaft 12 side in order to engage the second dog clutch 30, the controller 5E controls the torque of the generator 4 to accomplish the rotation synchronization. Then, the controller 5E moves the sleeve 32H or 32L in a direction toward the dog gear 11d or 15d by controlling the actuator. When the second dog clutch 30 is to be engaged in the engaging state of the first dog clutch 20, the controller 5E obtains the rotation speed of the output shaft 12 side using the axle rotation speed Nam calculated by the first calculator 5B. That is, in this case, the controller 5E engages the second dog clutch 30 after controlling the generator 4 on the basis of the axle rotation speed Nam calculated by the first calculator 5B and the generator rotation speed Ng detected by the generator rotation speed sensor 44 such that the second clutch 30 synchronizes the rotation.

Further, when the second dog clutch 30 is to be engaged in the disengaging state of the first dog clutch 20, the controller 5E obtains the rotation speed of the output shaft 12 side using the axle rotation speed Nax calculated by the second calculator 5D. That is, in this case, the controller 5E engages the second dog clutch 30 after controlling the generator 4 on the basis of the axle rotation speed Nax calculated by the second calculator 5D and the generator rotation speed Ng detected by the generator rotation speed sensor 44 such that the second clutch 30 synchronizes the rotation. The above control precisely obtains the axle rotation speed, regardless of the engaging-disengaging state of the first dog clutch 20, so that the precision of the rotation synchronization can be enhanced.

When the first deviation X stored in the monitoring unit 5C is a predetermined value Xp or more, the prohibitor 5F determines that at least one of the wheel speed sensor 42 and the motor rotation speed sensor 43 to have a possibility of having a failure, and prohibits the disengagement of the first dog clutch 20. The predetermined value Xp is set in advance to a value that can discriminate the presence or absence of a failure. The prohibitor 5F determines whether or not the first deviation X is equal to or greater than the predetermined value Xp regardless of the running modes or the engaging-disengaging states of the clutches 20 and 30. The prohibitor 5F may determine that at least one of the wheel speed sensor 42 and the generator rotation speed sensor 44 has a possibility of having a failure on the basis of the second deviation Y and prohibit engagement of the second dog clutch 30. Further, when determining that there is a possibility of failure, the control unit 5 may light a warning light indicating a failure, or may record a signal indicating a failure.

[5. Flow Chart]

Figure 4:
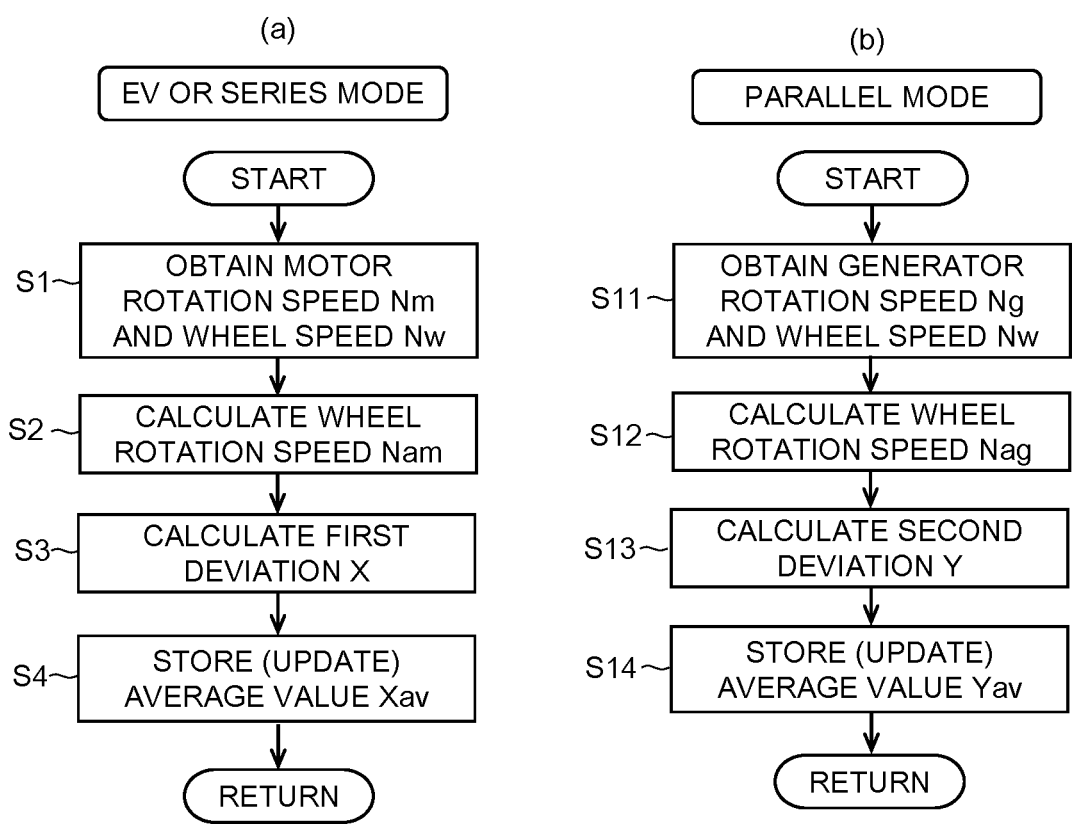
FIG. 4 is a flowchart example implemented in the monitoring unit of the control unit of FIG. 1, FIG. 4(*a*) being selected in an EV mode or series mode, and FIG. 4(*b*) being selected in a parallel mode.

FIGS. 4(a) and 4(b) are flowchart examples implemented in the monitoring unit 5C of the control unit 5 described above. When the EV mode or the series mode is selected in the selector 5A, the flowchart of FIG. 4(a) is executed in a predetermined calculation cycle, and when the parallel mode is selected, the flowchart of FIG. 4(b) is executed in a predetermined calculation cycle.

If the EV mode or series mode is selected, it is determined that the first dog clutch 20 is in an engaging state and the second dog clutch 30 is in a disengaging state. In this case, as shown in FIG. 4(a), the motor rotation speed Nm detected by the motor rotation speed sensor 43 and the wheel speed Nw detected by the wheel speed sensor 42 are obtained (Step S1). Then, the axle rotation speed Nam is calculated on the basis of the motor rotation speed Nm (Step S2), and the first deviation X is calculated by subtracting the wheel speed Nw from the axle rotation speed Nam (Step S3). Then, in Step S4, the average value Xav of the first deviation X is calculated, and the new average value Xav is stored (updated).

If the parallel mode is selected, it is determined the second dog clutch 30 is in the engaged state, and the engaging-disengaging state of the first dog clutch 20 is controlled in the disengaged state depending on whether or not motor assist is required. In this case, as shown in FIG. 4(b), the generator rotation speed Ng detected by the generator rotation speed sensor 44 and the wheel speed Nw detected by the wheel speed sensor 42 is obtained (Step S11). Then, the axle rotation speed Nag is calculated on the basis of the generator rotation speed Ng (Step S12), and the second deviation Y calculated by subtracting the wheel speed Nw from the axle rotation speed Nag is calculated (Step S13). Then, in Step S14, the average value Yav of the second deviation Y is calculated, and the new average value Yav is stored (updated).

FIG. 5 is an flowchart example executed in the selector 5A, the first calculator 5B, the second calculator 5D, and the controller 5E of the control unit 5 described above, and is executed in parallel with the flowcharts of FIGS. 4(a) and 4(b). This flowchart is executed at a predetermined calculation cycle when, for example, the main power supply of the vehicle 10 is turned on. It should be noted that this calculation cycle does not need to be the same as the calculation cycle when the flowcharts of FIGS. 4(a) and 4(b) are implemented.

As shown in FIG. 5, in Step T1, the information detected by each of the sensors 41 to 44 is obtained, and in Step T2, it is determined whether or not the current running mode is the EV mode or the series mode. If the EV mode or the series mode, it is determined in Step T3 whether or not a condition for switching to the parallel mode is satisfied. The condition includes, for example, the vehicle speed equal to or higher than a predetermined vehicle speed, and the running load equal to or higher than a predetermined load. If this condition is satisfied, the parallel mode is set in Step T4, and process (Steps T5 to T7) for engaging the second dog clutch 30 is performed.

First, the axle rotation speed Nam is calculated on the basis of the motor rotation speed Nm in Step T5, the generator 4 is controlled in Step T6 on the basis of the axle rotation speed Nam and the generator rotation speed Ng obtained in Step T1 such that the rotation is synchronized. Then, in Step T7, when rotation is synchronized, the actuator is controlled to engage second dog clutch 30. That is, the high-side dog clutch 30H or the low-side dog clutch 30L is engaged to make the power of the engine 2 into a state transmittable to the output shaft 12 and the flow is returned. If it is determined No in Step T3, the EV mode or the series mode is kept, and the flow is returned.

On the other hand, if it is determined that the mode is the parallel mode in Step T2, the process proceeds to Step T8 to determine whether or not a switching condition to the EV mode or the series mode is satisfied. The condition includes, for example, the vehicle speed lower than a predetermined vehicle speed, and the running load lower than a predetermined load. If this condition is not satisfied, that is, when the parallel mode is to be kept, whether motor assist is required is determined in Step T9.

If motor assist is not required, the process proceeds to Step T10 to disengage the first dog clutch 20. Next, it is determined whether or not the switching condition between the high-gear stage and the low-gear stage is satisfied in Step T11, and if the condition is not satisfied, the flow is returned. On the contrary, if the condition is satisfied, the process (steps T12 to T14) for the high-low switching is performed. Here, the high-low switching condition includes, for example, the vehicle speed in a high speed range and a high required output.

In Step T12, the axle rotation speed Nax is calculated from the wheel speed Nw obtained in Step T1 and the average value Xav of the first deviation X stored in Step S4 of FIG. 4(a). In Step T13, rotation synchronization is carried out on the basis of the axle rotation speed Nax and the generator rotation speed Ng obtained in Step T1, and the actuator is controlled to thereby switch between the high-gear stage and the low-gear stage (Step T14). Incidentally, in Step T13, since the axle rotation speed Nax considering the average value Xav of the first deviation X is used, the precision of the rotation synchronization is enhanced.

Further, if it is determined, during parallel running (No in Step T8), that the motor assist is required in Step T9, the process proceeds to Step T15, in which whether the first dog clutch 20 is engaged is determined. If the first dog clutch 20 is in the engaging state, the flow is returned because the motor assist can be immediately executed. On the other hand, if the first dog clutch 20 is in the disengaging state, the process proceeds to Step T16 to calculate the axle rotation speed Nag from the generator rotation speed Ng. Then, the rotation synchronization is performed on the basis of the axle rotation speed Nag and the motor rotation speed Nm obtained in Step T1 (Step T17), and the actuator is controlled to thereby engage the first dog clutch 20 (Step T18). This enables motor assist.

Further, when the switching condition to EV mode or series mode is satisfied in Step T8, the process proceeds to Step T20 to set EV mode or series mode. Then, the second dog clutch 30 is disengaged (Step T21), whether the first dog clutch 20 is in the engaging state is determined (Step T22). If the first dog clutch 20 is engaged, this flow is returned because the running state can be switched directly to the motor running.

On the other hand, if the first dog clutch 20 is disconnected, the process proceeds to Step T23 to calculate the axle rotation speed Nay from the wheel speed Nw obtained in Step T1 and the average value Yav of the second deviation Y stored in Step S14 of FIG. 4(b). In Step T24, the rotation synchronization is performed on the basis of the axle rotation speed Nay and the motor rotation speed Nm acquired in Step T1, the first dog clutch 20 is engaged by controlling the actuator (Step T25). Incidentally, in Step T24, since the axle rotation speed Nay considering the average value Yav of the second deviation Y is used, the precision of the rotation synchronization is enhanced.

[6. Effect]

(1) In the control unit 5 described above, when the clutches 20, 30 are in the engaging state, the axle rotation speed Nam, Nag are calculated on the basis of the values Nm, Ng detected by the rotation speed sensor 43 and 44 with high detection accuracy, and the deviations X, Y of the axle rotation seed Nam, Nag and the value Nw detected by the wheel speed sensor 42 is calculated and stored. Therefore, even under a situation in which only the value Nw detected by the wheel speed sensor 42 can be used (i.e., while the connecting/disconnecting mechanisms 20, 30 are disengaged), it is possible to calculate the axle rotation speed accurately. Consequently, for example, as in the above embodiment, it is possible to enhance the accuracy of the rotation synchronization when the clutches 20, 30 are engaged which are disposed on the path 51 between the motor 3 and the output shaft 12 and the path 52 between the generator 4 and the output shaft 12, so that vibration and noise during clutch engagement can be suppressed.

(2) The monitoring unit 5C described above periodically calculates the deviations X, Y while the vehicle 10 is running, and stores the average values Xav, Yav thereof, which can increase the calculation precision in the second calculator 5D. In addition, in cases where the monitoring unit 5C calculates deviations X and Y for each driving state (i.e., calculates multiple deviations X and Y), since the second calculator 5D selects the average values Xav, Yav corresponding to the driving state at the time of calculation, it is possible to further increase the calculation accuracy of the axle rotation speed.

(3) The above-described controller 5E uses, when the rotation of the second dog clutch 30 is to be synchronized to engage the second dog clutch 30 in the disengaged state of the first dog clutch 20, the axle rotation speed Nax calculated by the second calculator 5D. Further, when the rotation of the first dog clutch 20 is to be synchronized to engage the first dog clutch 20 in the disengaged state of the second dog clutch 30, the controller 5E uses the axle rotation speed Nay calculated by the second calculator 5D. Thus, when one of the clutches 30, 20 is to be engaged in a state where the other clutch 20, 30 is disengaged, since the wheel speed Nw uses the axle rotation speeds Nax, Nay considering deviations X, Y, it is possible to increase the rotation synchronization accuracy and thereby suppress the vibration and noise at the time of engagement of the clutches 20, 30.

(4) Further, since the transaxle 1 described above includes transmission stages from the output shaft 12 to the motor 3 less in number than the transmission stages from the output shaft 12 to the generator 4, the control on the rotation synchronization can be enhanced by using the axle rotation speed Nam based on the motor rotation speed Nm having less error in engaging the second dog clutch 30.

(5) The vehicle 10 described above is a hybrid vehicle including the engine 2 and the motor 3 for driving and a generator 4 for power generation, and the second dog clutch 30 interposed on the second path 52 has a high-low switching function in addition to a function to disengage the power transmission. Therefore, even if the motor 3 is disconnected from the output shaft 12 when switching between the high-gear stage and the low-gear stage while the vehicle 10 is running mainly on the engine 2 (i.e., during parallel running), it is possible to synchronize the rotation using the axle rotation speed Nax calculated by the second calculator 5D, quiet high-low switching can be achieved. Besides, the vehicle 10 can be driven by efficiently utilizing the engine output, which can enhance the power performance.

(6) The above-described controller 5E uses, when the rotation of the second dog clutch 30 is to be synchronized to engage the second dog clutch 30 in the engaging state of the first dog clutch 20, the axle rotation speed Nam calculated by the first calculator 5B. Further, when the rotation of the first dog clutch 20 is to be synchronized to engage the first dog clutch 20 in the state where the second dog clutch 30 is engaged, the controller 5E uses the axle rotation speed Nag calculated by the first calculator 5B. Thus, since, when one of the clutches 20, 30 is engaged in a state where the other one of the clutches 30, 20 is engaged, the axle rotation speeds Nam, Nag calculated on the basis of the values Nm, Ng of the rotation speed sensor 43, 44 with high detection accuracy are used, it is possible to increase the rotation synchronization accuracy, and to suppress the vibration and the noise at the time of engagement of the clutch 20, 30.

(7) The above-described controller 5E engages, when the second dog clutch 30 is to be engaged in a disengaging state of the first dog clutch 20, the second dog clutch 30 after controlling the generator 4 on the basis of the generator rotation speed Ng and the axle rotation speed Nax calculated by the second calculator 5D such that the rotation of the second dog clutch 30 is synchronized, vibration and noise at the time of engagement of the second dog clutch 30 can be suppressed, enhancing the accuracy of the rotation synchronization.

(8) Since, when the first dog clutch 20 is to be engaged from the disengaged state, the controller 5E engages the first dog clutch 20 after controlling the motor 3 on the basis of the motor rotation speed Nm and the axle rotation speed Nay calculated by the second calculator 5D such that the rotation of first dog clutch 20 is synchronized, vibration and noise at the time of engagement of the first dog clutch 20 can be suppressed, enhancing the accuracy of the rotation synchronization.

(9) When the first deviation X stored in the monitoring unit 5C is a predetermined value Xp or more, i.e., when the first deviation X is large, the prohibitor 5F described above determines that there is a high possibility that at least one of the motor rotation speed sensor 43 and the wheel speed sensor 42 has a failure and prohibits the disengagement of the first dog clutch 20. This can avoid vibration and noise generation at the time of engagement of the first dog clutch 20. Incidentally, when the prohibitor 5F determines, based on the second deviation Y, that there is a high possibility that at least one of the wheel speed sensor 42 and the generator rotation speed sensor 44 has a failure and prohibits the disengagement of the first dog clutch 30, vibration and noise generation at the time of engagement of the second dog clutch 30 can be suppressed.

[7. Modifications]

In the embodiment described above, the vehicle 10 is assumed to be a two-front-wheel-drive hybrid vehicle that mounts the engine 2 and the motor 3 on the front side thereof. The method for calculating the axle rotation speed and the rotation synchronization control described above can be applied to, as shown by a two-dotted chain line in FIG. 1, a four-wheel-drive hybrid vehicle that also mounts a rear motor 3R on the rear side thereof. This means that the vehicle 10 may include a front motor 3 (first rotating electric machine) for driving the front wheels 8 and a rear motor 3R (third rotating electric machine) for driving rear wheels 8R.

The rear motor 3R shown by a two-dotted chain line in FIG. 1 is connected via a second transaxle 60 to the axle connecting the right and left rear wheels 8R. However, the second transaxle 60 does not include a clutch. That is, the rear motor 3R is connected to the rear wheels 8R without a clutch. Further, the vehicle is provided with a rear motor rotation speed sensor 48 for detecting the rotation speed of the rear motor 3R (third rotating electric machine speed sensor) is provided.

In such a four-wheel-drive hybrid vehicle, when the wheel speed sensor 42 has a failure, the calculation of the axle rotation speed uses the value (rear motor rotation speed Nr) detected by the rear motor rotation speed sensor 48 instead of the wheel speed Nw. That is, when the wheel speed sensor 42 has a failure, the above-described second calculator 5D calculates the rotation speed (axle rotation speed) of the axle 9 connected to the front wheels 8 (one of wheels) on the basis of the rotation speed Nr of the rear motor 3R and the deviations X, Y or the average values Xav, Yav calculated (stored) by the monitoring unit 5C. With this configuration, the calculation accuracy of the axle rotation speed can be ensured even at the time of a failure of the wheel speed sensor 42.

The configuration of this modification may be applied to a hybrid vehicle in which the above-described power train 7 is mounted on the rear side thereof to allow the above motor 3 to drive rear wheels 8R and the third rotating electric machine (motor) serving as a driving source is mounted on the front side thereof to drive the front wheels 8. The control of this modification can be applied to a vehicle that includes at least a first rotating electric machine for driving one of a set of the front wheels 8 and a set of the rear wheels 8R and a third evolving armature for driving the other set of the wheels without a connecting/disconnecting mechanism. Since the third rotating electric machine is connected to the wheel without being interposed by a clutch, the rotation speed of the third rotating electric machine can be used in place of the wheel side Nw regardless of the engaging-disengaging state of the clutch.

[8. Miscellaneous]

The contents of the method for calculating the axle rotation speed and the rotation synchronization control described above are examples, and are not limited to those described above. For example, the monitoring unit 5C may calculate deviations X, Y only once while running, or may store (update) the deviations X, Y by overwriting with the calculated deviations X, Y in place of calculating and storing the average values Xav, Yay. Further, the prohibitor 5F described above may be omitted, and a sub-controller for controlling the engaging-disengaging state of the first dog clutch 20 may be provided independently of the controller 5E.

Further, in the above-described embodiment, when the first dog clutch 20 is to be engaged in the state where the second dog clutch 30 is disengaged, the axle rotation speed Nay is calculated by correcting the wheel speed Nw on the basis of the second deviation Y, but alternatively the axle rotation speed Nax may be calculated by correcting the wheel speed Nw on the basis of the first deviation X. Similarly, when the second dog clutch 30 is to be engaged in the state where the first dog clutch 20 is disengaged, the axle rotation speed Nax is calculated by correcting the wheel speed Nw on the basis of the first deviation X, but alternatively the axle rotation speed Nay may be calculated by correcting the wheel speed Nw on the basis of the second deviation Y. According to such a calculation method, even when the vehicle 10 has one rotating electric machine, the same operation and effect as those of the above-described embodiment can be obtained.

The structure of the transaxle 1 controlled by the control unit 5 described above is only an example, and is not limited to that described above. For example, in the transaxle 1 described above, the second dog clutch 30 is provided on each of the input shaft 11 and the first counter shaft 15, but alternatively, a single second dog clutch may be provided either one of the shafts 11 and 15. Further, both the first clutch mechanism and the second clutch mechanism are not limited to the dog clutches and may alternatively be clutch mechanisms such as a hydraulic friction clutch or an electromagnetic clutch. In addition, these clutch mechanisms may be disposed at positions other than those described above.

In addition, the above-described control can be performed at the time of engagement of a dog clutch even when one of the connecting/disconnecting mechanism on the first path 51 and the connecting/disconnecting mechanism on the second path 52 is a dog clutch and the other is a connecting/disconnecting mechanism of a hydraulic friction clutch, an electromagnetic clutch, or the like.

For example, when only the connecting/disconnecting mechanism of the first path 51 is a dog clutch, the rotation speed of the generator 4 (the first rotating electric machine) is detected by the generator rotation speed sensor 44 (the first rotating electric machine speed sensor), and the first calculator 5B calculates the axle rotation speed Nag on the basis of the generator rotation speed Ng (the first rotation speed) in the engaging state of the connecting/disconnecting mechanism on the second path 52. In addition, the monitoring unit 5C calculates the deviation Y between the axle rotational speed Nag and the wheel speed Nw. Then, if the second calculator 5D calculates the axle rotation speed Nay by correcting the wheel side Nw on the basis of the deviation Y in the disengaging state of the connecting/disconnecting mechanism on the second path 52, the controller 5E can synchronize the rotation accurately when causing the dog clutch on the first path 51 to engage regardless of the engaging-disengaging state on the second path 52.

The relative positions of the engine 2, the motor 3, and the generator 4 to the transaxle 1 are not limited to those described above. Depending on these relative positions, the arrangement of the six axles 11 to 16 in the transaxle 1 may be set. The arrangement of the gears provided on the respective shafts in the transaxle 1 is also an example, and is not limited to the one described above.

Further, the configuration of the powertrain 7 described above is an example, and to a vehicle having a configuration other than the power train 7 described above, the method for calculating the axle rotation speed described above and the rotation synchronization control may be applied. It is satisfactorily that the vehicle is provided with at least a connecting/disconnecting mechanism disposed on a power transmission path between a rotating electric machine (e.g., motor, generator, motor generator) and the output shaft, a sensor for detecting the rotation speed of the rotating electric machine, and the wheel speed sensor.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

DESCRIPTION OF REFERENCE SIGNS 2 engine
3 motor, front motor (first rotating electric machine)
3R rear motor (third rotating electric machine)
4 generator (first rotating electric machine, second rotating electric machine)
5 control unit
5B first calculator
5C monitoring unit
5D second calculator
5E controller (sub-controller)
5F prohibitor
8 driving wheel, front wheel, wheel
8R rear wheel, wheel
10 vehicle
12 output shaft
20 first dog clutch (first connecting/disconnecting mechanism, dog clutch)
30 second dog clutch (second connecting/disconnecting mechanism, dog clutch)
42 wheel speed sensor
43 motor rotation speed sensor (first rotating electric machine sensor)
44 generator rotation speed sensor (first rotating electric machine sensor, second rotating electric machine sensor)
48 rear motor rotation speed sensor (third rotating electric machine sensor)
51 first path (first power transmission path)
52 second path (second power transmission path)
Nag,Nam,Nax,Nay axle rotation speed
Ng generator rotation speed (first rotation speed, second rotation speed)
Nm motor rotation speed (first rotation speed)
Nw wheel speed
X first deviation
Xav average value
Xp predetermined value
Y second deviation
Yav average value

The invention claimed is:

1. A control unit for controlling a vehicle, the vehicle comprising a first connecting/disconnecting mechanism disposed on a first power transmission path between a first rotating electric machine mounted on the vehicle and an output shaft that drives a wheel, a first rotating electric machine speed sensor that detects a rotation speed of the first rotating electric machine as a first rotation speed, and a wheel speed sensor that detects a rotation speed of the wheel as a wheel speed, the control unit comprising:

a first calculator that calculates an axle rotation speed representing a rotation speed of the output shaft based on the first rotation speed in a state where the first connecting/disconnecting mechanism is engaged;
a monitoring unit that calculates a deviation between the axle rotation speed calculated by the first calculator and the wheel speed; and
a second calculator that calculates the axle rotation speed by calibrating the wheel speed based on the calculated deviation in a state where the first connecting/disconnecting mechanism is disengaged.

2. The control unit according to claim 1, wherein the monitoring unit periodically calculates the deviation while the vehicle is running and stores an average value of a plurality of the deviations periodically calculated.

3. The control unit according to claim 1, wherein
the vehicle further comprises a second rotating electric machine mounted on a second power transmission path connected to the output shaft and a second connecting/disconnecting mechanism disposed on the second power transmission path;
the control unit further comprises a controller that controls respective engaging-disengaging states of the first connecting/disconnecting mechanism and the second connecting/disconnecting mechanism; and
the controller uses the axle rotation speed calculated by the second calculator to synchronize rotation of the second connecting/disconnecting mechanism to engage the second connecting/disconnecting mechanism in a state where the first connecting/disconnecting mechanism is disengaged.

4. The control unit according to claim 2, wherein
the vehicle further comprises a second rotating electric machine mounted on a second power transmission path connected to the output shaft and a second connecting/disconnecting mechanism disposed on the second power transmission path;
the control unit further comprises a controller that controls respective engaging-disengaging states of the first connecting/disconnecting mechanism and the second connecting/disconnecting mechanism; and
the controller uses the axle rotation speed calculated by the second calculator to synchronize rotation of the second connecting/disconnecting mechanism to engage the second connecting/disconnecting mechanism in a state where the first connecting/disconnecting mechanism is disengaged.

5. The control unit according to claim 3, wherein the first power transmission path and the second power transmission path are configured such that a number of transmission stages from the output shaft to the first rotating electric machine is less than a number of transmission stages from the output shaft to the second rotating electric machine.

6. The control unit according to claim 4, wherein the first power transmission path and the second power transmission path are configured such that a number of transmission stages from the output shaft to the first rotating electric machine is less than a number of transmission stages from the output shaft to the second rotating electric machine.

7. The control unit according to claim 3, wherein
the vehicle further comprises an engine that is mounted on the vehicle and that causes the second rotating electric machine to generate electric power, and power of the engine is transmitted to the output shaft through the second power transmission path; and
the second connecting/disconnecting mechanism has a function of engaging and disengaging the power through the second power transmission path and a function of switching between a high-gear stage and a low-gear stage.

8. The control unit according to claim 4, wherein
the vehicle further comprises an engine that is mounted on the vehicle and that causes the second rotating electric machine to generate electric power, and power of the engine is transmitted to the output shaft through the second power transmission path; and
the second connecting/disconnecting mechanism has a function of engaging and disengaging the power through the second power transmission path and a function of switching between a high-gear stage and a low-gear stage.

9. The control unit according to claim 3, wherein the controller uses the axle rotation speed calculated by the first calculator to synchronize rotation of the second connecting/disconnecting mechanism to engage the second connecting/disconnecting mechanism in a state where the first connecting/disconnecting mechanism is engaged.

10. The control unit according to claim 4, wherein the controller uses the axle rotation speed calculated by the first calculator to synchronize rotation of the second connecting/disconnecting mechanism to engage the second connecting/disconnecting mechanism in a state where the first connecting/disconnecting mechanism is engaged.

11. The control unit according to claim 3, wherein:
the vehicle further comprises a second rotating electric machine speed sensor that detects a rotation speed of the second rotating electric machine as a second rotation speed;
in engaging the second connecting/disconnecting mechanism in a state where the first connecting/disconnecting mechanism is disengaged, the controller engages the second connecting/disconnecting mechanism after controlling, based on the axle rotation speed calculated by the second calculator and the second rotation speed detected by the second rotating electric machine speed sensor, the second rotating electric machine such that rotation of the second connecting/disconnecting mechanism synchronizes.

12. The control unit according to claim 4, wherein:
the vehicle further comprises a second rotating electric machine speed sensor that detects a rotation speed of the second rotating electric machine as a second rotation speed;
in engaging the second connecting/disconnecting mechanism in a state where the first connecting/disconnecting mechanism is disengaged, the controller engages the second connecting/disconnecting mechanism after controlling, based on the axle rotation speed calculated by the second calculator and the second rotation speed detected by the second rotating electric machine speed sensor, the second rotating electric machine such that rotation of the second connecting/disconnecting mechanism synchronizes.

13. The control unit according to claim 1, wherein
the control unit further comprises a sub-controller that controls an engaging-disengaging state of the first connecting/disconnecting mechanism;
in engaging the first connecting/disconnecting mechanism in a state of being disengaged, the sub-controller engages the first connecting/disconnecting mechanism after controlling, based on the axle rotation speed calculated by the second calculator and the first rotation speed detected by the first rotating electric machine speed sensor, the first rotating electric machine such that rotation of the first connecting/disconnecting mechanism synchronizes.

14. The control unit according to claim 3, wherein:
the vehicle further comprises a second rotating electric machine speed sensor that detects a rotation speed of the second rotating electric machine as a second rotation speed;
each of the first connecting/disconnecting mechanism and the second connecting/disconnecting mechanism is a dog clutch;
the first calculator calculates the axle rotation speed based on the second rotation speed in a state where the second connecting/disconnecting mechanism on the second power transmission path is engaged;
the monitoring unit calculates a second deviation representing a deviation between the axle rotation speed calculated based on the second rotation speed and the wheel speed;
the second calculator calculates the axle rotation speed using the wheel speed and the second deviation in the state where the second connecting/disconnecting mechanism on the second power transmission path is disengaged; and
the controller uses the axle rotation speed calculated from the wheel speed and the second deviation to synchronize rotation of the first connecting/disconnecting mechanism to engage the first connecting/disconnecting mechanism in a state where the second connecting/disconnecting mechanism on the second power transmission path is disengaged.

15. The control unit according to claim 1, further comprising a prohibitor that prohibits, when the deviation is a predetermined value or more, the first connecting/disconnecting mechanism from being disengaged.

16. The control unit according to claim 1, wherein:
the vehicle comprises the first rotating electric machine that drives one of a front wheel and a rear wheel, a third rotating electric machine that drives the other one of the front wheel and the rear wheel without being interposed by a connecting/disconnecting mechanism, and a third rotating electric machine speed sensor that detects a rotation speed of the third rotating electric machine as a third rotation speed; and
when the wheel speed sensor has a failure, the second calculator calculates, based on the third rotation speed, a rotation speed of an axle connected to the one wheel.

\* \* \* \* \*